(No Model.)
W. A. HAMMOND.
MONUMENT.
No. 582,470.  Patented May 11, 1897.
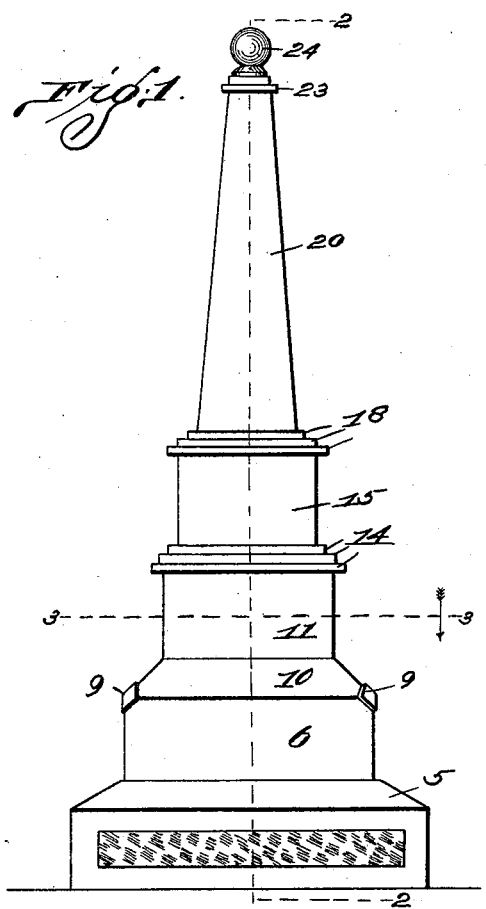
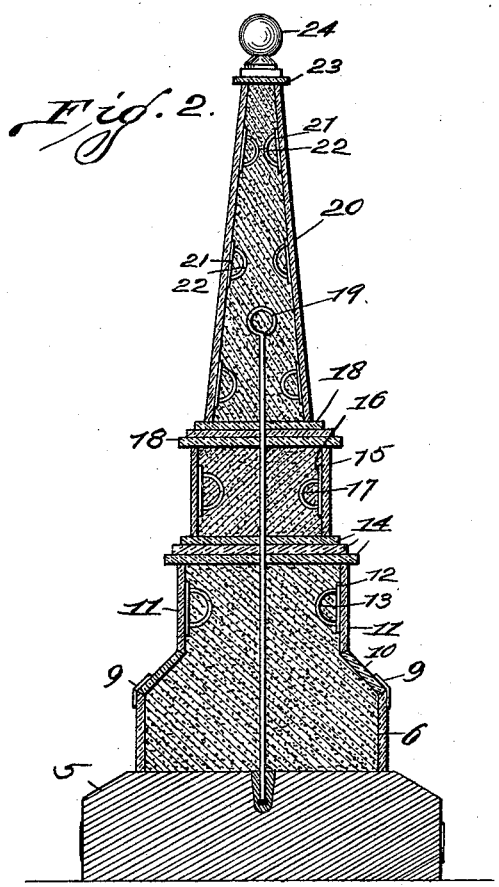
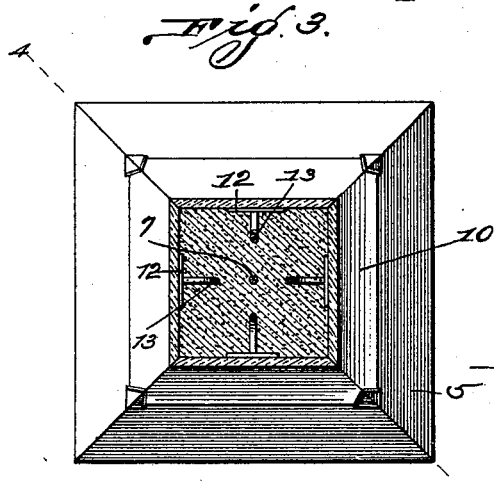
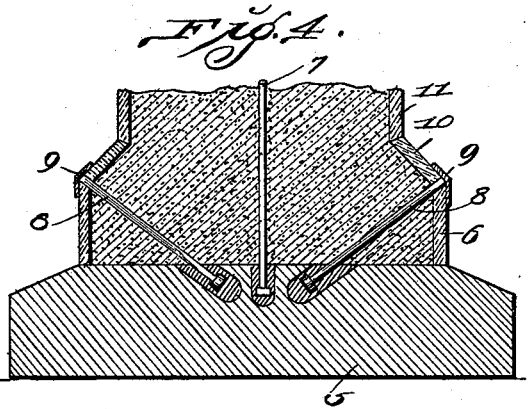
Attest:
J. F. Smith
S. G. Wells
Inventor
Wm. A. Hammond
By Higdon, Longan & Higdon
Atty's

United States Patent Office.

WILLIAM A. HAMMOND, OF ST. LOUIS, MISSOURI, ASSIGNOR OF ONE-HALF TO ROBERT W. TAYLOR, OF SAME PLACE.

MONUMENT.

SPECIFICATION forming part of Letters Patent No. 582,470, dated May 11, 1897.

Application filed January 4, 1897. Serial No. 617,941. (No model.)

*To all whom it may concern:*

Be it known that I, WILLIAM A. HAMMOND, of the city of St. Louis, State of Missouri, have invented certain new and useful Improvements in Monuments, of which the following is a full, clear, and exact description, reference being had to the accompanying drawings, forming a part hereof.

My invention relates to monuments; and it consists in the novel construction, combination, and arrangement of parts hereinafter shown, described, and claimed.

Figure 1 is a side elevation of my improved monument. Fig. 2 is a vertical sectional view taken approximately on the line 2 2 of Fig. 1. Fig. 3 is a horizontal sectional view taken approximately on the line 3 3 of Fig. 1 and looking downwardly. Fig. 4 is a vertical sectional view taken diagonally through the base, as indicated by the line 4 4 in Fig. 3, the upper portion of the monument being broken away to economize space.

In the construction of a monument in accordance with the principles of my present invention I employ the base 5, which may be of suitable limestone, granite, or marble, and of the desired shape and size, and the plates of glass 6 are placed in vertical position and end to end upon the base 5, the meeting ends of said plates of glass being beveled, as required, to form tight joints between said plates. The anchor-rod 7 has a head upon its lower end, which head is fixed in the base 5 by drilling a hole from the upper face into said base, inserting the head, and then pouring lead around said head. The anchor-rods 8 are set in the base 5 in a manner similar to the anchor-rod 7, and said anchor-rods 8 project upwardly and outwardly from said base to the upper corners of the plates 6. Portions of said upper corners of the plates 6 are cut away to allow said anchor-rods to pass to a point outside of said plates, and upon the upper outer ends of said anchor-rods 8 are formed the metallic plates 9, which plates fit against the outer faces of the plates of glass, as required to hold the upper edges of said plates of glass from tipping outwardly. The space within the plates of glass 6 and above the base 5 is filled with artificial stone, such as granitoid, cement, sand, or concrete.

The inclined plates of glass 10 are placed with their lower edges resting upon the upper edges of the vertical plates of glass 6, and the ends of said plates 10 are mitered, as required, to form close joints, and the lower corners of said plates are cut away to receive portions of the anchor-rods 8, and the plates 9 are shaped to engage the outer surfaces of said lower corners.

The vertical plates of glass 11 are placed in position with their lower edges resting upon the upper edges of the plates of glass 10 and with their meeting ends beveled to form joints. The upper edges of the plates of glass 6 and the lower edges of the plates 10 are beveled to form tight joints between said plates, and the upper edges of the plates 10 and the lower edges of the plates 11 are beveled to form tight joints.

Before placing the plates 11 in position the anchor-plates 12 are attached to the inner faces of said plates 11, or they may be formed integral with said plates 11 and upon said inner faces, and the handles 13 are formed upon or attached to said plates 12. When the space within the plates 11 is filled with the material forming the artificial stone, the handles 13 will become embedded in said material and said handles will then hold said plates 11 in position relative to said artificial stone.

The horizontal plates of glass 14 have apertures in their centers, and said plates are placed in position by running the anchor-rod 7 upwardly through said apertures, and said plates rest upon the upper edges of the plates 11 and upon the artificial stone within said plates.

The vertical plates of glass 15 have the anchor-plates 16 attached to or formed integral with their inner faces, and the handles 17 are formed upon or attached to said plates 16. The plates 15 are placed in position with their lower edges resting upon the upper face of the upper one of the plates 14 and with their ends beveled and in contact, and the space within said plates is filled with a suitable material forming artificial stone.

The horizontal plates of glass 18 have openings through their centers to receive the anchor-rod 7, and said horizontal plates of glass rest upon the upper edges of said vertical plates 15 and upon the artificial stone within said plates 15. After the plates 18 have been placed in position a loop 19 is formed in the upper end of the anchor-rod 7.

The plates of glass 20 are wider at their lower ends than at their upper ends and have anchor-plates 21, attached to or formed integral with their inner faces, and the handles 22, attached to or formed upon said plates 21. The meeting edges of the plates 20 are beveled to form good joints, and said plates are placed in position upon the upper one of the plates 18, and the space within said plates is filled with a material similar to the material within the plates 11 and 15.

The horizontal plate 23 is placed in position upon the upper edges of the plates 20, and the globe 24 rests upon the plate 23.

In constructing a monument as above described the meeting edges of the plates of glass should be ground, to form close fits, and they may or may not be cemented together. The inner faces of all the plates of glass should be painted before putting the concrete in position in order that the concrete may not be visible through said glass. The horizontal plates of glass may be cemented together and they may be cemented to the edges of the vertical plates of glass. The anchor-rods 8, together with the plates 9 upon the ends of said rods, form braces to secure the superstructure to the base 5, and the anchor-rod 7, with the loop 19 upon its upper end, forms a secure connection between the different sections of the monument. The anchor-plates 13, 16, and 21 are of such a size that they may be securely cemented to the inner faces of the plates 11, 15, and 20, respectively.

Any desired inscriptions or symbols may be painted upon the inner faces of the plates of glass before painting said glass to hide the concrete or stone, and when completed the monument may present a very handsome appearance and at the same time will be practically indestructible.

I claim—

1. In a monument, a suitable base, vertical plates of glass placed end to end and resting upon said base, anchor-rods seated in said base and extending upwardly and outwardly to the upper corners of said vertical plates of glass, metallic plates attached to the upper outer ends of said anchor-rods and engaging the outer faces of said vertical plates of glass, inclined plates of glass placed end to end and resting upon the upper edges of said vertical plates of glass, vertical plates of glass placed end to end and resting upon the upper edges of said inclined plates of glass, anchors attached to and projecting inwardly from the last-mentioned vertical plates of glass, an artificial stone cast in position within said vertical plates of glass, and a plurality of horizontal plates of glass resting upon the upper edges of the last-mentioned vertical plates of glass, substantially as specified.

2. In a monument, a suitable base, vertical plates of glass placed end to end and resting upon said base, anchor-rods seated in said base and extending upwardly and outwardly to the upper corners of said vertical plates of glass, metallic plates attached to the upper outer ends of said anchor-rods and engaging the outer faces of said vertical plates of glass, inclined plates of glass placed end to end and resting upon the upper edges of said vertical plates of glass, vertical plates of glass placed end to end and resting upon the upper edges of said inclined plates of glass, anchors attached to and projecting inwardly from the last-mentioned vertical plates of glass, an artificial stone cast in position within said vertical plates of glass, a plurality of horizontal plates of glass resting upon the upper edges of the last-mentioned vertical plates of glass, vertical plates of glass placed together end to end and resting upon said horizontal plates of glass, anchors attached to and projecting inwardly from the last-mentioned vertical plates of glass, an artificial stone cast in position within said last-mentioned vertical plates of glass, and a plurality of horizontal plates of glass resting upon the upper edges of said last-mentioned vertical plates of glass, substantially as specified.

In testimony whereof I affix my signature in presence of two witnesses.

WILLIAM A. HAMMOND.

Witnesses:
S. G. WELLS,
MAUD GRIFFIN.